(12) United States Patent
Fujimatsu et al.

(10) Patent No.: US 6,635,385 B2
(45) Date of Patent: Oct. 21, 2003

(54) METHOD FOR MANUFACTURING ELECTRODE PLATES FOR BATTERY

(75) Inventors: Hitoshi Fujimatsu, Ueda (JP); Hiroshi Yoshizawa, Hirakata (JP); Hizuru Koshina, Neyagawa (JP); Masakage Komori, Utsunomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 402 days.

(21) Appl. No.: 09/813,178

(22) Filed: Mar. 20, 2001

(65) Prior Publication Data

US 2001/0024750 A1 Sep. 27, 2001

(30) Foreign Application Priority Data

Mar. 24, 2000 (JP) ........................................ 2000-084816

(51) Int. Cl.[7] ................................................ H01M 4/04
(52) U.S. Cl. ...................................... 429/217; 29/623.1
(58) Field of Search .............................. 429/217, 218.1, 429/209; 29/623.1, 623.2

(56) References Cited

FOREIGN PATENT DOCUMENTS

| EP | 0756345 | 1/1997 |
|---|---|---|
| EP | 0982787 | 3/2000 |
| EP | 1067612 | 1/2001 |
| JP | 4-249861 | 9/1992 |
| JP | 7-161348 | 6/1995 |
| JP | 8-273669 | 10/1996 |

*Primary Examiner*—Randy Gulakowski
(74) *Attorney, Agent, or Firm*—Jordan and Hamburg LLP

(57) ABSTRACT

A mixture of a polyolefin-based resin and a solvent is heated to a temperature at which at least part of the polyolefin-based resin melts to produce a viscous, gel-like adhesive solution. A mixture of the adhesive solution, an active material, and a conductive material is kneaded to produce a paste-form mixture, and a collector is coated with this paste-form mixture to form a mixture layer. The collector with the mixture layer formed thereon is then heated and dried, after which it is press-molded to a specific thickness and cut to a specific size to produce electrode plates.

4 Claims, 2 Drawing Sheets

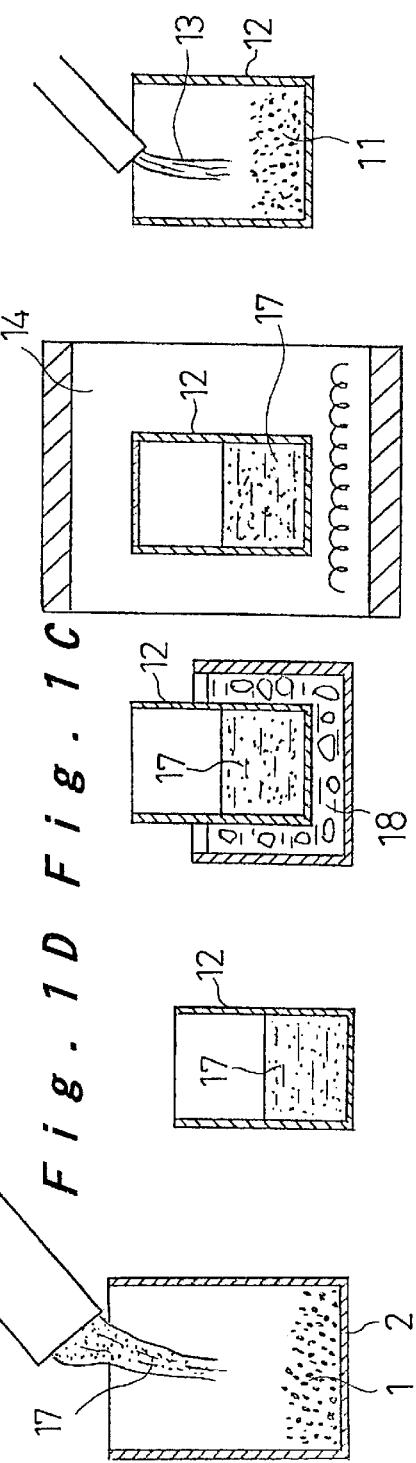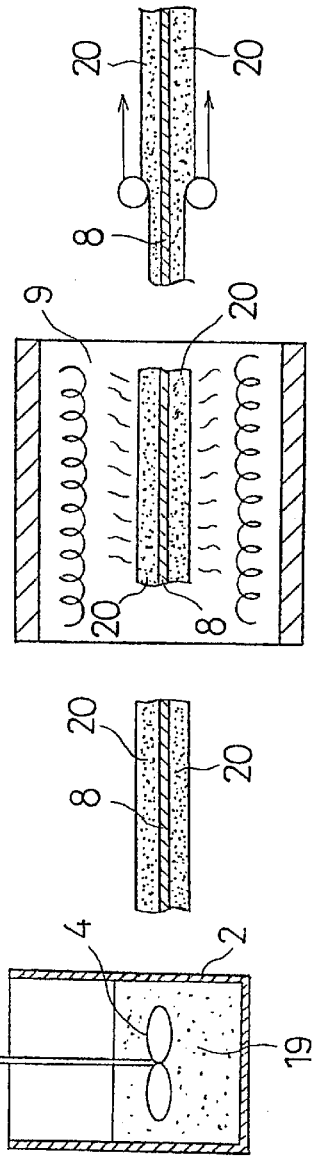

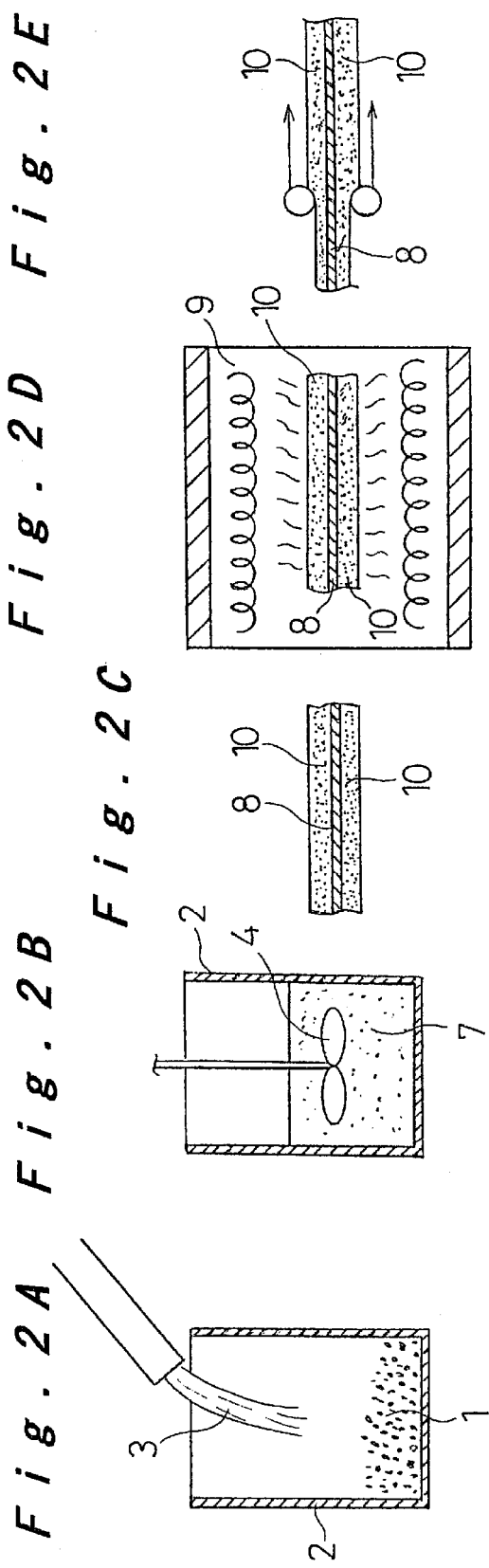

METHOD FOR MANUFACTURING ELECTRODE PLATES FOR BATTERY

BACKGROUND OF THE INVENTION

1. Field of the Invention

The present invention relates to a method for manufacturing positive and negative electrode plates primarily for use in a nonaqueous electrolyte battery.

2. Description of Related Art

With the widespread use of cordless or portable audio-visual devices, personal computers, and the like, the demand for batteries having a smaller size, a lighter weight, and increased energy density as power supply for these devices is increasing. For such purpose, nonaqueous electrolyte batteries such as lithium rechargeable batteries are particularly suitable because of their high energy density.

Positive electrode plates of nonaqueous electrolyte batteries are generally manufactured through the steps illustrated in FIGS. 2A through 2E. First, a powdered positive electrode mixture 1 obtained by adding a conductive material to a positive electrode active material is put into a mixing vessel 2, and a binding additive 3 produced by mixing a binder into a solvent is poured into this mixing vessel 2, as shown in FIG. 2A. Then, as shown in FIG. 2B, the powdered positive electrode mixture 1 and the binding additive 3 in the mixing vessel 2 are thoroughly stirred and kneaded by a stirrer 4 to produce a paste-form positive electrode mixture 7.

As shown in FIG. 2C, the paste-form positive electrode mixture 7 is applied under pressure to both sides of a positive electrode collector 8 (composed, for example, of a sheet having a fibrous mesh structure or a band-like metal foil), forming a positive electrode mixture layer 10 that is supported on the positive electrode collector 8. The mixture layer 10 is then placed in a drying chamber 9 as shown in FIG. 2D, where it is heated for 2 hours at a temperature of 150° C., for instance, thereby being dried.

During the heating, the solvent in the binding additive 3 evaporates away, leaving the active material and the conductive material bonded to the positive electrode collector 8 by the binder. Finally, the positive electrode mixture layer 10 is press-molded to a specific thickness in the calendering step shown in FIG. 2E. After this, the positive electrode collector 8 is punched out or cut to the required size to create the desired positive electrode plate.

For the positive electrode active material of a nonaqueous electrolyte battery, $LiCoO_2$ with an average particle size of just a few microns, is generally used, whereas the conductive material is acetylene black or natural graphite. For the binder, it has been proposed in the past that a powder of polyethylene (hereinafter referred to as PE) resin be used. (See Japanese Laid-Open Patent Applications 4-249861, 7-161348, and 8-273669, respectively.)

PE is known, however, as one of the most difficult polymer materials to bond, because there is no solvent in which it has good solubility. When PE is used as a binder, a problem is that the poor adhesive strength of PE leads to cracking of the positive electrode plates formed by calendering. In prior art this has been dealt with by raising the adhesive strength of PE by heating the positive electrode collector 8 at a high temperature in the drying step following the formation of the positive electrode mixture layer 10. Unfortunately, PE, which has a low melting point, is completely melted by this high temperature heating, and the PE in this completely molten state adheres around the positive electrode active material. Consequently the chemical reaction between the $LiCoO_2$ serving as the positive electrode active material and the carbon material serving as the negative electrode material is hampered by the PE adhering around the positive electrode active material, resulting in diminished battery performance.

One possible way to raise the adhesive strength of PE without heating to a high temperature is to increase the PE content in the paste-form positive electrode mixture 7. In specific terms, PE with a particle size of at least 50 μm has previously been used, the PE content in the paste-form positive electrode mixture 7 being set higher to about 15 to 25 wt %. In this case, not only is it wasteful to increase the amount of binder, which does not contribute anything to battery function, but the mixing ratio of the positive electrode active material per unit of volume in the paste-form positive electrode mixture 7 is also reduced in proportion to the increase in the amount of binder, which leads to a decrease in the discharge capacity per unit of volume of the battery.

Polytetrafluoroethylene (hereinafter referred to as PTFE), polyvinylidene fluoride (hereinafter referred to as PVDF), and other fluorine-based resin powders have also been used in recent years as binders. This is because PTFE and PVDF have higher adhesive strength than PE, and when melted by high temperature heating in the drying step they enter a porous, fibrous state, so an advantage is that the chemical reaction between the positive electrode active material and the negative electrode active material is hardly hampered at all.

Nevertheless, the above-mentioned PTFE and PVDF used as binders undergo a chemical reaction with the electrolytic solution during the use of the battery, resulting in defluorination, and this compromises the adhesive strength of the positive electrode mixture layer 10 to the positive electrode collector 8. Particularly in rechargeable batteries, because the electrode plates are repeatedly subjected to volumetric expansion and contraction during charging and discharging, the above-mentioned decrease in adhesive strength can cause the active material particles or the conductive material to fall out of the positive electrode collector 8, or the particles to be widely separated, which leads to a drop in conductivity. This is one of the factors that can shorten the cycling life of a battery, and also poses problems with the shelf life of a battery. Furthermore, in addition to their high raw material cost, PTFE and PVDF take a long time to be kneaded with the powder positive electrode mixture 1, and this drives up the manufacturing cost, resulting in the increase in the price of positive electrode plates of the nonaqueous electrolyte battery.

SUMMARY OF THE INVENTION

The present invention has been devised to solve the above-described problems encountered in the past, and it is an object thereof to provide an improved method for manufacturing battery electrode plates, wherein a polyolefin-based resin such as PE, which is a relatively inexpensive material and is stable with respect to electrolyte, is used as the binder, the adhesive strength of the binder being raised without heating it to a high temperature or increasing the amount of resin contained in the binder.

The method for manufacturing battery electrode plates according to the invention includes mixing a solvent into a polyolefin-based resin used as a binder, heating the mixture of the polyolefin-based resin and the solvent at a temperature at which at least part of the polyolefin-based resin will melt, thereby producing a viscous, gelled adhesive solution, kneading a mixture of a conductive material, an active material, and the adhesive solution to produce a paste mixture, coating a collector with the paste mixture to form a mixture layer, heating and drying the collector on which the mixture layer is formed, and press-molding the mixture layer to a specific thickness.

Preferably, the adhesive solution produced by heating to a specific temperature is mixed with the active material and the conductive material after first being rapidly cooled to a temperature between −175° C. and 30° C.

The temperature in the heating and drying step is set to be over the boiling point of the solvent in the adhesive solution and under the melting point of the polyolefin-based resin.

Most preferably, the polyolefin-based resin is polyethylene, and the mixture of the polyethylene and the solvent is heated to a temperature between 30 to 160°C.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIGS. 1A–1I illustrate the manufacturing steps in the method for manufacturing battery electrode plates according to one embodiment of the present invention; and FIG. 2A–2E illustrate the manufacturing steps in a conventional method for manufacturing battery electrode plates.

DESCRIPTION OF THE PREFERRED EMBODIMENTS

Preferred embodiments of the present invention will now be described through reference to the drawings. FIGS. 1A to 1I schematically illustrate the sequential steps in a specific example of the method for manufacturing battery electrode plates of the present invention. First, at the step shown in FIG. 1A, a PE powder with a particle size of 1 to 30 μm is put into a heating vessel 12 as a binder 11 for a positive electrode mixture. One of toluene, decalin, tetralin, tetrachloroethane, xylene, dichlorobenzene, and N-methylpyrrolidone is put into the heating vessel 12 as an organic solvent 13. At this point, the binder 11 is merely mixed in the heating vessel 12, and does not dissolve into the solvent 13.

Next, as shown in FIG. 1B, the heating vessel 12 is placed in a heating chamber 14 after being sealed with glass, and the binder 11 and solvent 13 contained therein are heated to a specific temperature. The melting point of the binder 11 is lowered by the presence of the solvent 13, and the above-mentioned specific temperature is set to a temperature that is under the melting point of the binder 11. For instance, in the case of PE, it may be heated to about 140° C., and all or part of the surface of PE powder particles is melted to create a gel-like solution. More specifically, at a temperature lower than the inherent melting point of PE, part on the surface of the PE powder particles starts to melt and swell by the solvent, thereby falling into a gel-like state. In the following description, this gel-like PE solution will be referred to as the adhesive solution 17.

Next, the adhesive solution 17 is rapidly cooled such that its temperature drops to 0° C. by immersing the heating vessel 12 in ice water 18 as shown in FIG. 1C, for example.

By rapidly cooling the adhesive solution 17 to 0° C., the gel-like state of PE is maintained uniform, whereby an adhesive solution 17 of consistent quality is obtained with good reproducibility. If the adhesive solution was cooled gradually, there would be variance in the quality of the adhesive solution after cooling due to hysteresis (cooling time, temperature differential, etc.) in the cooling process. Uniformity and stability in the quality of gel-like adhesive solution are desirable in enhancing productivity and in facilitating temperature setting in the drying step later.

Once the adhesive solution 17 has been returned to normal temperature as shown in FIG. 1D, it is poured into a mixing vessel 2 containing a powdered positive electrode mixture 1 produced by adding a conductive material to a positive electrode active material, as shown in FIG. 1E. Then, as shown in FIG. 1F, the powdered positive electrode mixture 1 and the adhesive solution 17 in the mixing vessel 2 are thoroughly stirred and kneaded by a stirrer 4 to create a paste-form positive electrode mixture 19. As shown in FIG. 1G, this paste-form positive electrode mixture 19 is applied in a specific thickness under pressure over both sides of a positive electrode collector 8 (composed, for example, of a sheet having a fibrous mesh structure or a band-like metal foil), forming a positive electrode mixture layer 20 that is supported on the positive electrode collector 8.

Then, as shown in FIG. 1H, the positive electrode collector 8 with the positive electrode mixture layer 20 has formed thereon is placed in a drying chamber 9 and heated. The temperature inside the drying chamber 9 is set to be over the boiling point of the solvent 13 in the adhesive solution 17 and under the melting point of the binder 11. When the adhesive solution 17 is heated to the temperature set as described above, the solvent 13 contained inside evaporates away, and as this happens the adhesive strength of the binder 11 rises. Thereupon, the binder 11 is intermingled between the molecules of the active material and the conductive material, thereby bonding these to the positive electrode collector 8. Finally, the positive electrode mixture layer 20 is press-molded in a specific thickness in the calendering step shown in FIG. 1I. The positive electrode collector 8 is punched out or cut to the required size to create the desired positive electrode plates.

The PE used as the binder 11 has excellent chemical resistance that makes it inert to organic electrolytes, has good affinity, and is also inexpensive. Therefore, the positive electrode plates obtained through the above steps solve the problems encountered in the past of high cost, decreased shelf life, and reduced cycling life caused by a deterioration in adhesive strength due to the defluorination that occurred when PTFE, PVDF, or another such fluorine-based resin powder was used as the binder.

While PE is one of the most difficult polymer materials to bond, necessary adhesion is obtained by mixing it with the solvent 13 and heating the mixture to a temperature at which just the surface of the PE melts, so that it undergoes surface modification. The gel-like adhesive solution 17 thus obtained exhibits strong adhesion, even though it is heated in the drying step to a relatively low temperature that is over the boiling point of the solvent 13 but under the melting point of the PE. Because of the lower temperature, the PE does not reach a completely molten state, and therefore the problem of molten resin adhering around the active material is eliminated. Battery performance is accordingly improved. Also, the heating equipment can be made simple and compact.

In view of the gelling process step of PE as described above, the required adhesive strength is obtained despite the smaller amount in which the PE is contained in the paste-form positive electrode mixture 19. Accordingly, the mixing ratio of the positive electrode active material in the positive electrode mixture is increased in proportion to the reduction in the amount of binder 11, which affords an increase in discharge capacity per unit of volume of the battery.

Instead of using PE, a crystalline polyolefin-based resin other than PE, such as polypropylene, polymethylpentene, or polybutene, may be used for the binder 11, by selecting a suitable solvent 13 that is capable of gelling these resins. The use of a polyolefin-based resin, which is a stable battery material also used for making separators, as the binder 11 makes it possible to apply the above-described process steps to the manufacture of negative electrode plates, too.

Examples of experiments conducted by the inventors in which favorable results were obtained will now be described.

FIRST EXAMPLE

High-density polyethylene (hereinafter referred to as HDPE) powder serving as the binder 11 was mixed with dichlorobenzene serving as the solvent 13. The mixture was heated until all of it reached 115° C., which produced an adhesive solution 17 in which only the surface of the HDPE was in a viscous state. The HDPE used here had a density of 0.94 g/cm$^2$ and a molecular weight of 125,000. The adhesive solution 17 was rapidly cooled to 0° C., after which it was returned to normal temperature. LiCoO$_2$ (used as the active material), acetylene black (used as the conductive material), and the PE in the form of the adhesive solution 17 were mixed in a weight ratio of 92:3:5, and this mixture was thoroughly kneaded to produce a paste-form positive electrode mixture 19. This paste-form positive electrode mixture 19 was applied to both sides of a positive electrode collector 8 composed of aluminum foil to form a positive electrode mixture layer 20, after which drying and press-molding were performed, and this product was cut into pieces measuring 37×350 mm to obtain positive electrode plates for use in a lithium rechargeable battery.

The second to fifteenth examples given below are variations on the first example give above in terms of the materials, mixing ratio, heating temperature, and so forth, and therefore only the changes to the first example will be noted.

SECOND EXAMPLE

Tetralin was used as the solvent 13, and a mixture of this solvent 13 and HDPE powder was heated until all of it reached 105° C.

THIRD EXAMPLE

Decalin was used as the solvent 13, and a mixture of this solvent 13 and HDPE powder was heated until all of it reached 110° C.

FOURTH EXAMPLE

Low-density polyethylene (hereinafter referred to as LDPE) powder was used as the binder 11, and a mixture of this LDPE powder and the solvent 13 was heated until all of it reached 90° C. The LDPE used here had a density of 0.92 g/cm$^2$ and a molecular weight of 115,000. It has been ascertained that the higher the molecular weight of the binder 11 being used in the present invention, the higher the adhesive strength of the adhesive solution 17, and the lower the degree of crystallization of the binder 11, the lower the temperature at which an adhesion effect will be exhibited. Therefore, if LDPE, which has a lower degree of crystallization than HDPE, is used as the binder 11 as in this example, then a gelled adhesive solution 17 will be obtained by heating at a relatively low temperature of 90° C., which is considered industrially advantageous.

FIFTH EXAMPLE

Polypropylene powder (melting point: 158 to 160° C.) was used as the binder 11, and a mixture of this polypropylene powder and the solvent 13 was heated until all of it reached 140° C.

SIXTH EXAMPLE

Polymethylpentene powder was used as the binder 11, and a mixture of this polymethylpentene powder and the solvent 13 was heated until all of it reached 150° C.

SEVENTH EXAMPLE

Polybutene powder (melting point: 126 to 128° C.) was used as the binder 11, and a mixture of this polybutene powder and the solvent 13 was heated until all of it reached 120° C.

EIGHTH EXAMPLE

LiCoO$_2$ (as the active material), acetylene black (as the conductive material), and the PE in the form of the adhesive solution 17 were mixed in a weight ratio of 96:3:1, and this mixture was thoroughly kneaded to produce a paste-form positive electrode mixture 19.

NINTH EXAMPLE

LiCoO$_2$ (as the active material), acetylene black (as the conductive material), and the PE in the form of the adhesive solution 17 were mixed in a weight ratio of 94:3:3, and this mixture was thoroughly kneaded to produce a paste-form positive electrode mixture 19.

TENTH EXAMPLE

LiCoO$_2$ (as the active material), acetylene black (as the conductive material), and the PE in the form of the adhesive solution 17 were mixed in a weight ratio of 90:3:7, and this mixture was thoroughly kneaded to produce a paste-form positive electrode mixture 19.

ELEVENTH EXAMPLE

LiCoO$_2$ (as the active material), acetylene black (as the conductive material), and the PE in the form of the adhesive solution 17 were mixed in a weight ratio of 88:3:9, and this mixture was thoroughly kneaded to produce a paste-form positive electrode mixture 19.

TWELFTH EXAMPLE

Flake graphite was used instead of LiCoO$_2$ as the active material, and this flake graphite and the PE in the form of the adhesive solution 17 were mixed in a weight ratio of 95:5.

THIRTEENTH EXAMPLE

An active material featuring a material composed of composite particles having an Si phase and an NiSi$_2$ phase, carbonaceous fibers (as the conductive material), and the PE in the form of the adhesive solution 17 were mixed in a weight ratio of 92:3:5, and this mixture was thoroughly kneaded to produce a paste-form positive electrode mixture 19.

FOURTEENTH EXAMPLE $Li_{2.5}Co_{0.5}N$ (as the active material), natural graphite (as the conductive material), and the PE in the form of the adhesive solution 17 were mixed in a weight ratio of 92:3:5, and this mixture was thoroughly kneaded to produce a paste-form positive electrode mixture 19.

FIFTEENTH EXAMPLE $LiMn_2O_4$ (as the active material), acetylene black (as the conductive material), and the PE in the form of the adhesive solution 17 were mixed in a weight ratio of 92:3:5, and this mixture was thoroughly kneaded to produce a paste-form positive electrode mixture 19.

In all the batteries produced using the electrode plates obtained in these examples, the required cycling life was ensured, good storage stability was obtained, and the discharge capacity was increased. Also, in all of the examples, the electrode plates could be produced less expensively than conventional electrode plates in which a fluorine-based resin was used as a binder.

As discussed above, because a polyolefin-based resin is used as a binder in the method of the present invention for manufacturing battery electrode plates, this method solves the problems encountered in the past of high cost, decreased shelf life, and reduced cycling life when a fluorine-based resin powder was used as a binder. A polyolefin-based resin, which is a polymer material that is difficult to bond, is subjected to surface modification and made into a gel-form adhesive solution that satisfies the basic requirements of an adhesive, after which this is mixed with an active material and an conductive material, and therefore sufficient adhesive strength is obtained in the polyolefin-based resin without increasing the amount of resin, and without heating to a high temperature. Therefore, the proportion of the positive electrode active material in the mixture is increased, and the discharge capacity per unit of volume of the battery is raised.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method for manufacturing electrode plates for a battery, comprising:

mixing a solvent into a polyolefin-based resin used as a binder;

heating the mixture of the polyolefin-based resin and the solvent at a temperature at which at least part of the polyolefin-based resin will melt, thereby producing a viscous, gelled adhesive solution;

kneading a mixture of a conductive material, a battery active material, and the gelled adhesive solution to produce a paste mixture;

coating a collector with the paste mixture to form a mixture layer;

heating and drying the collector on which the mixture layer is formed; and press-molding the mixture layer to a specific thickness.

2. The method for manufacturing electrode plates according to claim 1, further comprising a step of cooling the adhesive solution to a temperature between −175° C. and 30° C. prior to mixing thereof with the conductive material and the battery active material.

3. The method for manufacturing electrode plates according to claim 1, wherein the temperature in the heating and drying step is set to be over the boiling point of the solvent in the adhesive solution and under the melting point of the polyolefin-based resin.

4. The method for manufacturing electrode plates according to claim 1, wherein the polyolefin-based resin is polyethylene, and the mixture of the polyethylene and the solvent is heated to a temperature between 30° C. to 160° C.

* * * * *